United States Patent [19]

Sato

[11] 4,120,037
[45] Oct. 10, 1978

[54] DESK-TOP ELECTRONIC CALCULATOR AND TAPE RECORDER ASSEMBLY

[75] Inventor: Masaaki Sato, Hachioji, Japan

[73] Assignee: Olympus Optical Company Ltd., Tokyo, Japan

[21] Appl. No.: 774,401

[22] Filed: Mar. 4, 1977

[30] Foreign Application Priority Data

Mar. 23, 1976 [JP] Japan .............................. 51-34932[U]

[51] Int. Cl.² .............................................. G06F 15/02
[52] U.S. Cl. ............................... 364/705; 179/100.11; 364/708; D14/5; D14/72
[58] Field of Search ............................... 235/152, 156; 179/100.11; 360/137; D14/5, 47, 72–74; 364/705, 708

[56] References Cited

U.S. PATENT DOCUMENTS

| D. 189,503 | 12/1960 | Frankel | D14/72 |
|---|---|---|---|
| D. 229,509 | 12/1973 | Yanagisawa et al. | D14/5 |
| D. 239,866 | 5/1976 | Imai | D14/73 |
| D. 244,877 | 6/1977 | McLaughlin | D14/73 |
| 3,803,834 | 4/1974 | Reese | 235/156 UX |
| 3,867,619 | 2/1975 | Arauchi | 235/156 |
| 3,916,122 | 10/1975 | Sato et al. | 179/100.11 |
| 3,937,939 | 2/1976 | Frenkel | 235/156 |
| 3,978,328 | 8/1976 | Fabry et al. | 235/156 |
| 3,995,123 | 11/1976 | Wilson | 235/156 X |
| 4,002,892 | 1/1977 | Zielinski | 235/156 |

OTHER PUBLICATIONS

Electronics Magazine, Apr. 3, 1975, pp. 40–41.

*Primary Examiner*—Jerry Smith
*Attorney, Agent, or Firm*—Ostrolenk, Faber, Gerb & Soffen

[57] ABSTRACT

A desk-top electronic calculator and cassette tape recorder assembly is provided which includes a housing in the form of a triangular prism. Input keys and a numeral display are disposed on one side of the housing while a cassette receiving chamber for the tape recorder is formed in another side thereof so that each side may be placed on the front side to permit an optimum manipulation of the calculator and the recorder, respectively. The assembly is compact in construction for convenience in portable use. The remaining side of the housing may be utilized in conjunction with another instrument.

9 Claims, 10 Drawing Figures

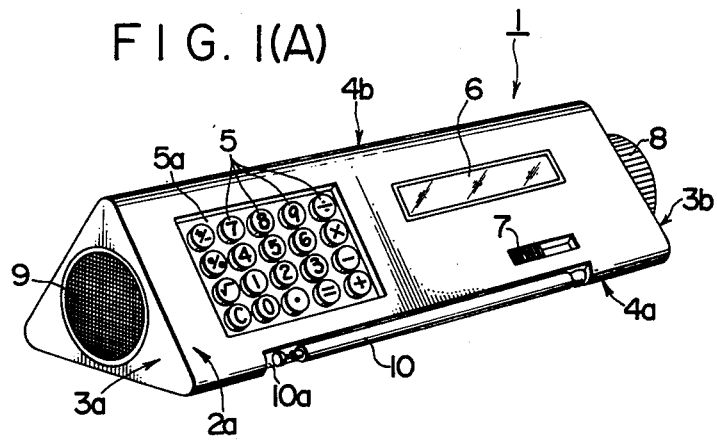
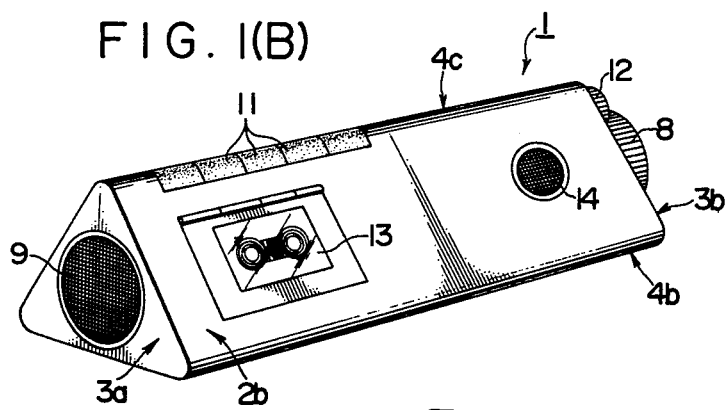
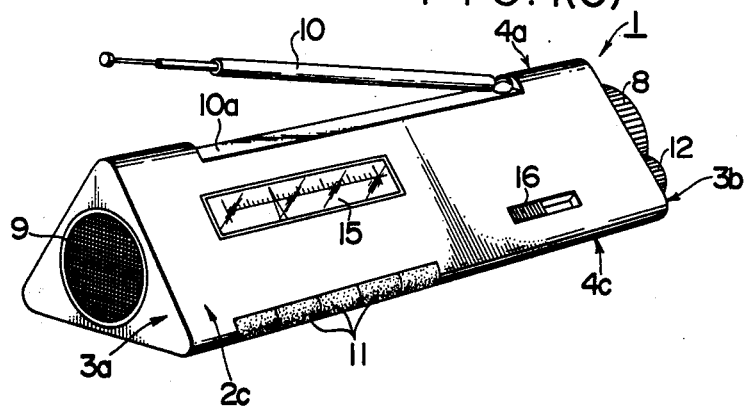

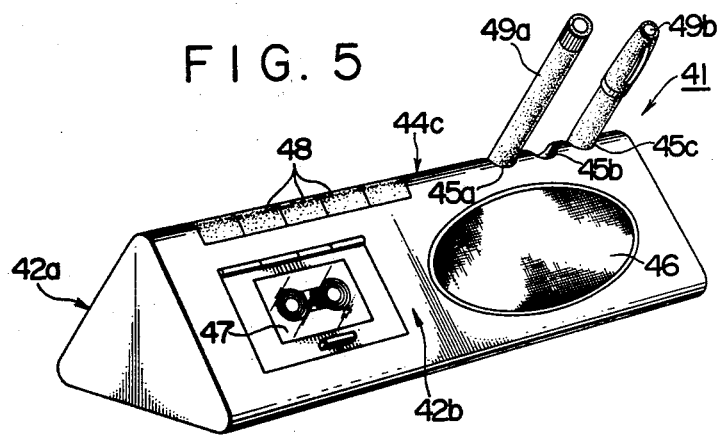
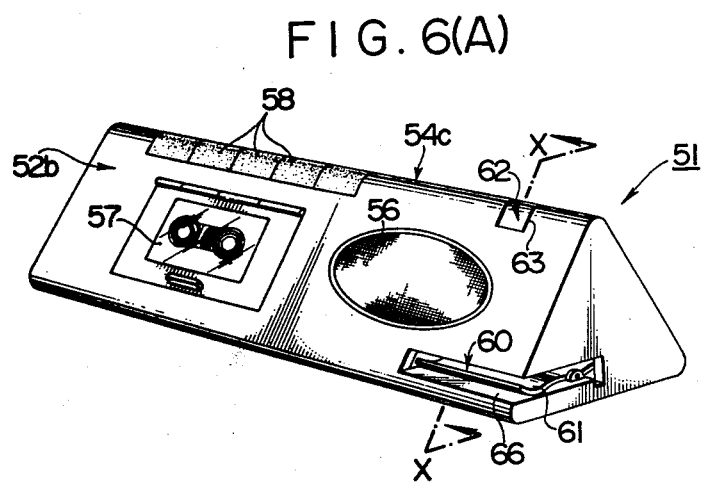
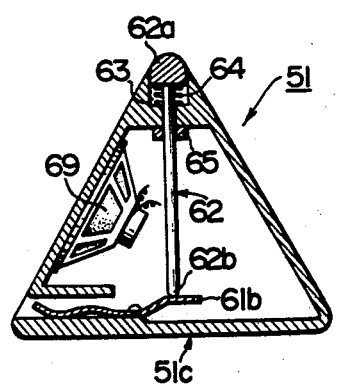
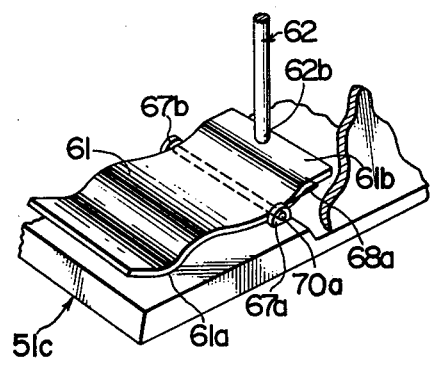

DESK-TOP ELECTRONIC CALCULATOR AND TAPE RECORDER ASSEMBLY

BACKGROUND OF THE INVENTION

The invention relates to a desk-top calculator and tape recorder assembly, and more particularly to such assembly including a housing which is in the form of a triangular prism and which houses a desk-top electronic calculator, a tape recorder and other instruments.

Recently, the construction of desk-top electronic calculators, radio sets and tape recorders is increasingly reduced in size for convenience in portable use. These instruments have gained popularity, but it is recognized that it is inconvenient to carry about more than one of them concurrently when they are produced as separate items. These instruments have been designed principally for portable use, and there has been left much to be improved in respect of manipulation and functioning when they are used on the desk.

SUMMARY OF THE INVENTION

It is an object of the invention to provide an electronic calculator and tape recorder assembly including a housing in a form of triangular prism in which are contained a desk-top electronic calculator, a radio set and a tape recorder sharing certain components such as source battery, loudspeaker or the like which may be used in common, thereby providing a compact construction, and which is designed to provide an optimum manipulation and functioning of the respective units.

It is another object of the invention to provide an assembly of the type mentioned above which additionally includes a digital clock, a penholder, a paper holder or the like, thus affording practical utility.

BRIEF DESCRIPTION OF THE DRAWINGS

FIG. 1A is a perspective view of the assembly according to one embodiment of the invention, principally illustrating the input keys and numeral display associated with the desk-top electronic calculator;

FIG. 1B is a similar perspective view, principally illustrating a cassette receiving chamber associated with the tape recorder;

FIG. 1C is a similar perspective view, principally illustrating a tuning dial associated with the radio set;

FIG. 5 is a perspective view of still another embodiment of the assembly including a penholder;

FIG. 6A is a perspective view of a still further embodiment of the invention which includes a paper holder;

FIG. 6B is a cross section taken along the line X—X shown in FIG. 6A; and

FIG. 6C is a fragmentary perspective view, to an enlarged scale, of the paper holder shown in FIG. 6A.

DETAILED DESCRIPTION OF EMBODIMENTS

Figure 2:
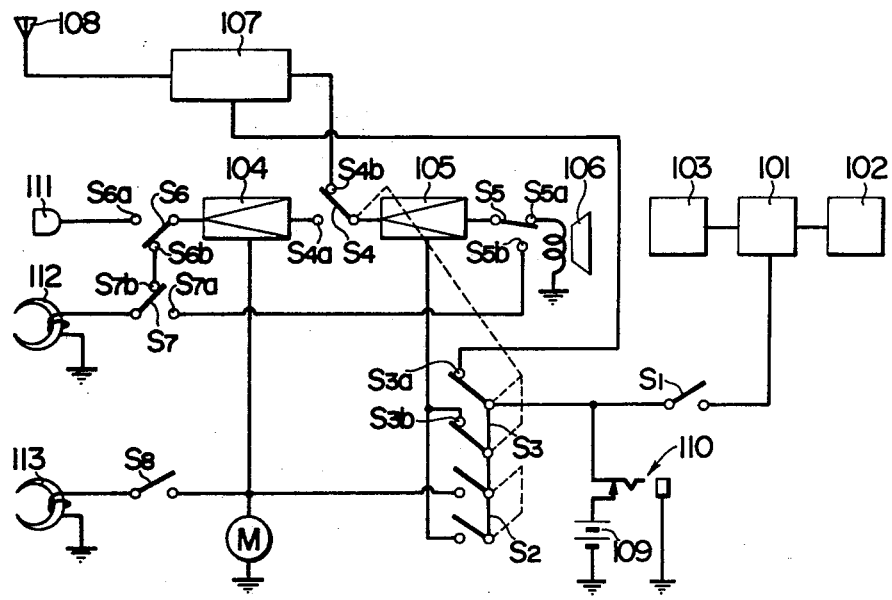
FIG. 2 is a circuit diagram of the electrical circuit of the assembly shown in FIG. 1.

FIGS. 1A–1C are perspective views of a desk-top electronic calculator and tape recorder assembly constructed in accordance with one embodiment of the invention. In FIG. 1A, a tape recorder 1 includes a housing in the form of a triangular prism. A group of input keys 5 associated with a desk-top electronic calculator are provided in one side 2a of the housing in the left-hand portion thereof, the keys being disposed in a recess 5a so that their heads do not project above the plane of the side 2a. A numeral display 6 also associated with the calculator is disposed in the right-hand portion of the side 2a, and a knob 7 of a main switch is disposed therein directly below the numeral display 6. The left-hand end face 3a of the housing is formed with a grille 9 for a loudspeaker which is used in common for the radio set and the tape recorder while a knob 8 for a tuning dial associated with the radio set and a knob 12 of a volume control used in common for the radio set and the tape recorder are disposed in the right-hand end face 3b thereof (see FIG. 1B). The bottom edge 4a of the side 2a is partly cut away to form a recess 10a in which a rod antenna 10 of known form is received. FIG. 1B shows the housing as it is rotated through 120° forwardly about the edge 4a from the position shown in FIG. 1A.

In FIG. 1B, there is shown another side 2b of the housing, in the left-hand portion of which is formed a cassette receiving chamber associated with the tape recorder which is closed by a window cover 13. A grille 14 for an internally housed microphone is formed in the side 2b in the right-hand portion thereof. A group of buttons 11 for operating the tape recorder to establish a record or playback mode or similar purposes is disposed in the left-hand portion of the upper edge 4c of the side 2b. When the housing is rotated through 120° forwardly about the lower edge 4b of the side 2b, there results an orientation as shown in FIG. 1C. In this Figure, another side 2c of the housing is shown which is formed with a frequency dial 15 associated with the radio set in the left-hand portion while a knob 16 of a radio set/tape recorder changeover switch is disposed in the right-hand portion thereof. It is to be noted that parts similar to those shown in FIG. 1A are designated by like reference characters in FIGS. 1B and C.

FIG. 2 shows the electrical circuit of the assembly 1 including the desk-top electronic calculator, radio set and tape recorder thus constructed. Specifically, the circuit includes a microphone 111, a record/playback head 112, an erase head 113, a pair of amplifiers 104 and 105, a loudspeaker 106 and a motor M. The circuit also includes a main switch $S_2$ and changeover switches $S_5$ to $S_8$, which may be operated to actuate the recorder for record, playback or erase operation. A source battery 109 is connected through a jack 110, which is adapted to be connected with an A.C. adaptor, with a main switch $S_1$ for the electronic calculator, with a main switch $S_3$ for the radio set and with a main switch $S_2$ for the tape recorder.

The electrical circuit of the radio tuner comprises an antenna 108 and a tuner circuit 107, the output of which may be connected through a changeover switch $S_4$ with the input of an amplifier 105 contained in the tape recorder. The output of the amplifier 105 is connected through a changeover switch $S_5$ with the input of a loudspeaker 106.

The main switch $S_3$ is ganged with the changeover switch $S_4$ and comprises a single throw, double pole switch. When the switch $S_4$ is thrown to a stationary contact $S_4b$, the main switch $S_3$ which is ganged therewith is thrown to stationary contacts $S_3a$, $S_3b$ to be connected with the tuner circuit 107 and the amplifier 105. When a record/playback actuating button of the tape recorder is operated, the main switch $S_2$ of the tape recorder is turned on, enabling a recording of an output from the radio set. When the main switch $S_3$ is opened, only the main switch $S_2$ of the tape recorder remains on, so that it is possible to perform a recording of an input from a microphone or a playback from a tape. In FIG. 2, the circuit is shown in a condition to activate the radio set.

The electrical circuit of the electronic calculator comprises an arithmetic unit 101, a keyboard 102 and a numerical display 103. By selectively operating the knobs 7, 16 and the group of operating buttons 11 depending on the intended use, the switches $S_1$ to $S_8$ may be turned on to close a desired electrical circuit. While in the embodiment described above, the housing of the assembly has been shown in the form of a triangular prism, it should be understood that it may be trapezoidal or any other configuration in cross section.

Figure 3:
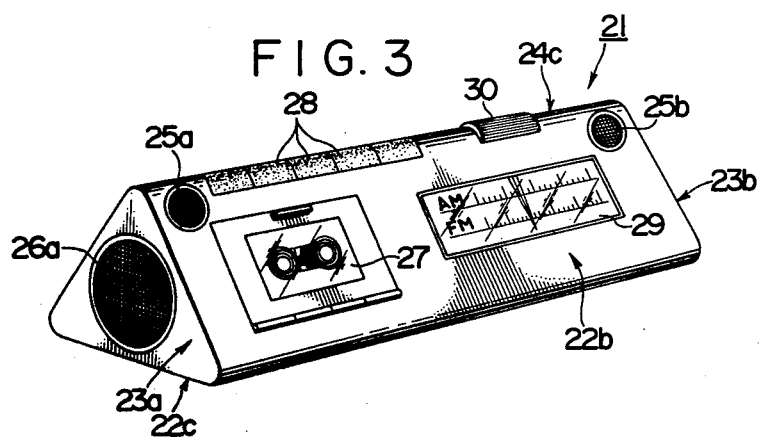
FIG. 3 is a perspective view of another embodiment of the invention.

FIG. 3 shows another embodiment of the invention in which the radio set and the tape recorder of the assembly are designed as a stereophonic version. The assembly 21 has a housing which is similar in configuration to that shown in FIG. 1. The housing includes one side 22b, in which a window 27 which closes a cassette receiving chamber is provided in a manner similar to that shown in FIG. 1B, and a group of buttons 28 which are used to establish a record/playback mode or to stop the tape recorder are disposed in the region of the upper edge 24c at a position above the window 27. A pair of grilles 25a, 25b for internally housing microphones for purpose of stereophonic recording are disposed in the opposite ends of the side 22b toward the upper edge 24c. In addition, a dial 29 of the radio set is located in the right-hand portion of the side 22b. A knob 30 for a tuning dial of the stereophonic radio set is located in a region of the upper edge 24c which is just above the dial 29. It will be noted that the knob 30 is formed by a rotatable cylindrical body. A pair of grilles 26a, 26b (26 being invisible) for internally housing loudspeakers which are used in common in the stereophonic tape recorder and the stereophonic radio set are disposed in the opposite end faces 23a, 23b of the housing. The arrangement of other parts as well as the arrangement of the electrical circuit are similar to the embodiment shown in FIG. 1, and therefore will not be described.

The housing of the assembly 21 in the form of a triangular prism provides a high stability when it is placed on a table, and since the cassette receiving chamber 27 and the dial 29 of the radio set are located in the inclined side extending between the upper edge and the bottom, observation of the tape running condition within the cassette and the pointer on the dial of the radio set is greatly facilitated. The location of the loudspeakers inside the opposite end faces of the triangular housing enhances the stereophonic effect for the compact structure of the overall assembly. The provision of the pair of microphone permits a stereophonic recording, including a stereophonic recording of an output from the radio set. In addition, a stereophonic playback is also possible. When a micro-cassette developed by the present applicant is used in the tape recorder, the assembly can be further reduced in size for convenience in portable use.

In addition to the convenience in portable use as a result of its compact structure, the electronic calculator and tape recorder assembly contained in a housing which is shaped as a triangular prism provides an increased stability when it is used on a desk, for example.

Figure 4:
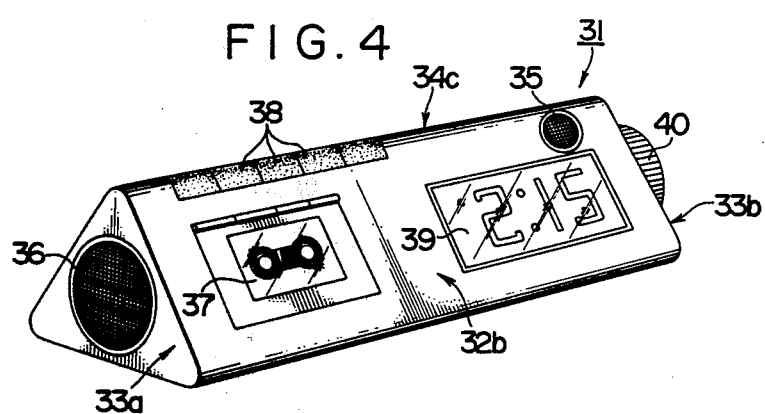
FIG. 4 is a similar perspective view of a further embodiment in which the assembly also includes a digital clock.

In view of this, the electronic calculator and tape recorder assembly may also incorporate a digital clock, a penholder, a paper holder or the like as illustrated in FIGS. 4 to 6. FIG. 4 is a perspective view of such assembly which incorporates a digital clock. The electronic calculator and tape recorder assembly 31 is similar in configuration to the embodiment shown in FIG. 1. A window 37 for covering a cassette receiving chamber formed in one side 32b of the housing, a group of buttons 38 located in the upper edge above the window 37 for operating the tape recorder, and a grille 36 formed in the left-hand end face of the housing for internally housing a loudspeaker are similar in arrangement to those shown in FIG. 1B. In this embodiment, a time display 39 of a digital clock is located in the side 32b to the right of the window 37, and a small grille 35 for internally housing a microphone is located above the time display 39. A time adjusting knob 40 associated with the digital clock is disposed on the right-hand end face 33b of the housing. It should be understood that the digital clock is disposed within the housing below the time display 39, and the knob 40 may be used to provide a time adjustment thereof. In addition to allowing a portable use, the assembly 31 may be used as a desk-top digital clock when it is placed on a desk while at the same time providing the combined functions as the electronic calculator and the tape recorder.

FIG. 5 shows a further embodiment in which the electronic calculator and tape recorder assembly is formed with a penholder for its use on a desk. The assembly 41 is similar in configuration to that shown in FIG. 1, and a window 47 for covering a cassette receiving chamber is formed in the left-hand portion of one side 42b of the housing in a manner similar to that shown in FIG. 1. A group of buttons 48 for operating the tape recorder are disposed in the upper edge 44c of the housing. A grille 46 is disposed in the inclined side 42b to the right of the window 47, and a plurality of pen receiving openings 45a, 45b, 45c are formed in the upper edge 44c at a position above the window 46 for receiving a ball pen 49, a fountain pen 49b or the like. It should be understood that parts associated with the electronic calculator are disposed on the rear side 42a in a manner similar to that as shown in FIG. 1A. It will be understood that the number, the orientation and the diameter and depth of respective pen receiving openings may be chosen at will in conjunction with the intended use, taking into consideration the arrangement of the internally housed parts. The location of the grille 46 in the inclined side 42b permits an optimum directivity of the loudspeaker to be attained. In this manner, this embodiment provides penholders when the assembly is used on a desk.

FIGS. 6A to 6C show another embodiment of the electronic calculator and tape recorder assembly 51 which is formed with a paper holder 60. As before, the overall configuration of the assembly 51 is similar to that of FIG. 5, and a window 57 for covering a cassette receiving chamber, a grille 56 for internally housing a loudspeaker and a group of buttons for operating the tape recorder are arranged in one side 52b and upper edge 54c of its housing in a manner similar to those mentioned above. The paper holder 60 is located in the right-hand bottom portion of the housing, and comprising a clip blade 61 and a rod 62 which is used to operate the clip blade 61. As shown in FIGS. 6A and 6B, a pushbutton 62a is secured to the top of the rod 62, the upper surface of which is shaped in conformity to the configuration of the upper edge 54c of the housing of the assembly 62a the bottom portion of which is in the form of a square prism which is loosely fitted into a square groove 63 formed in the upper edge 54c of the housing toward its right-hand end. The rod 62 is in the form of a round rod which extends through the bottom wall of the square groove 63, and its lower end 62b bears against the upper surface of a portion 61b of the clip blade 61. A compression spring 64 is disposed on the rod 62 intermediate the lower surface of the pushbutton 62a and the bottom of the groove 63, thereby urging the rod upward. However, the upward movement of the rod 62 is limited by the abutment of a locking ring 65 secured to the rod 62 against the bottom wall, whereby the pushbutton 62a remains stationary with its upper surface maintained in conformity to the curved surface of the upper edge 54c of the housing. In FIG. 6B, numeral 69 represents a loudspeaker.

As shown in FIGS. 6B and C, the clip blade 61 comprises a generally rectangular, undulating sheet, and a pair of rotating shafts 70a, 70b (70b being invisible) are mounted on the opposite edges of the sheet at the bottom of the undulation at a position to the right-hand side of its center. The clip blade 61 is disposed on a bottom surface of a notch 66 (see FIG. 6A) which is formed parallel to the bottom surface 51c of the housing, at the lower, right-hand end of the housing of the assembly 51. A pair of bearings 67a, 67b extend from the bottom surface and receive the rotating shafts 70a, 70b for rotation. The clip blade 61 is urged to rotate counterclockwise about the shafts 65a, 65b by torsion springs 68a, 68b (68b being invisible) which have their one end secured to the bearings 67a, 67b and their other end engaged with the rear surface of the clip blade 61 so that the lower surface of the bottom 61a of the undulation in the left-hand region of the clip blade 61 bears against the bottom surface of the notch 66 for holding a paper inserted therebetween.

When inserting a paper between said surfaces, the pushbutton 62a may be manually depressed against the resilience of the coiled spring 64, whereby the clip blade 61 rotates clockwise about the shafts 70a (70b), facilitating the insertion of a paper. Upon release, the rod 62 moves upward, whereby the clip blade 61 rotates counter-clockwise to hold the inserted paper in place under its own bias.

What is claimed is:

1. A desk-top electronic calculator and tape recorder assembly characterized in that the assembly has a housing in the form of a triangular prism, the housing having one side in which input keys and a numerical display associated with the calculator are disposed and another side in which a cassette receiving chamber is formed, and a loudspeaker is disposed in at least one face of the housing.

2. An assembly according to claim 1 in which a group of buttons for operating the tape recorder are disposed in the upper edge of the side of the housing in which the cassette receiving chamber is formed.

3. An assembly according to claim 1 in which a stereophonic tape cassette receiving chamber is formed in one side of the housing, and a pair of grilles for internally housing microphones are disposed in this side adjacent to the opposite ends, a pair of loudspeakers being disposed along the opposite end faces of the housing.

4. An assembly according to claim 1, in which a time display of a digital clock is disposed in the side of the housing in which the cassette receiving chamber is formed.

5. An assembly according to claim 1, including a penholder formed in the upper edge defined between the side of the housing in which parts associated with the electronic calculator are disposed and the side of the housing in which parts associated with the tape recorder are disposed, and a loudspeaker is disposed in said tape-recorder side of the housing.

6. An assembly according to claim 1, including a paper holder formed in a part of the housing, the paper holder comprising a clip blade and a push rod.

7. The apparatus of claim 1 wherein the input keys, numerical display, and cassette receiving chamber are all arranged so as to be flush with their respective surfaces so that any surface of the triangular prismatic housing may serve as a supporting surface for utilization of the remaining two surfaces.

8. An assembly according to claim 1 in which a radio set is disposed with said housing, and a tuning dial associated with said radio set is disposed in an end face of the housing.

9. An assembly according to claim 8 in which the tuning dial associated with the radio set is disposed in the side of the housing in which the cassette receiving chamber is formed, and an operating knob for the dial is disposed in the upper edge of this side.

* * * * *